(12) United States Patent
Alexander et al.

(10) Patent No.: US 6,824,348 B2
(45) Date of Patent: Nov. 30, 2004

(54) WIND ROTOR OPERABLE IN SLOW WIND SPEEDS

(76) Inventors: Barton D. Alexander, 244 21 Ave. NW., Great Falls, MT (US) 59404; James C. Helfrich, 200 Choteau St., Sun River, MT (US) 59483

( * ) Notice: Subject to any disclaimer, the term of this patent is extended or adjusted under 35 U.S.C. 154(b) by 0 days.

(21) Appl. No.: 10/420,397

(22) Filed: Apr. 22, 2003

(65) Prior Publication Data

US 2004/0213670 A1 Oct. 28, 2004

(51) Int. Cl.$^7$ .............................................. F03D 3/00
(52) U.S. Cl. ..................... 415/4.2; 415/4.4; 415/907; 416/111; 416/132 B; 416/140
(58) Field of Search ........................... 415/4.2, 4.4, 907; 416/111, 132 B, 140; 290/44, 55

(56) References Cited

U.S. PATENT DOCUMENTS

| | | | |
|---|---|---|---|
| 148,100 A | | 3/1874 | White |
| 279,066 A | | 6/1883 | Witherspoon |
| 588,143 A | | 8/1897 | Hall |
| 755,497 A | | 3/1904 | Hyatt |
| 1,015,517 A | * | 1/1912 | Snyder .................... 416/118 |
| 1,314,232 A | | 8/1919 | Wohr |
| 1,535,585 A | | 4/1925 | Dyer |
| 2,247,929 A | * | 7/1941 | Terhune .................... 416/46 |
| 3,743,848 A | * | 7/1973 | Strickland .................. 290/55 |
| 3,897,170 A | | 7/1975 | Darvishian |
| 4,203,707 A | | 5/1980 | Stepp |
| 4,218,183 A | | 8/1980 | Dall-Winther |
| 4,406,584 A | * | 9/1983 | Stepp ....................... 416/41 |
| 4,468,169 A | | 8/1984 | Williams |
| 4,530,642 A | | 7/1985 | Yang |
| 5,642,983 A | | 7/1997 | Chung |

* cited by examiner

*Primary Examiner*—Ninh H. Nguyen
(74) *Attorney, Agent, or Firm*—Jerry Johnson

(57) ABSTRACT

A wind rotor comprises a base, a rotor frame rotationally supported on the base for movement about a substantially vertical axis in one of a clockwise or counter clockwise direction, and a plurality of wind receiving vanes pivotally disposed on the rotor frame for movement about a substantially vertical axis in a clockwise and counter clockwise direction between a first closed position and a second open position. The movement of each vane from the first closed position to the second open position further being independent of the other vanes. A variable resistance damping mechanism assembly is disposed between each vane and the rotor frame. The variable resistance damping mechanism is configured to provide damping in both the clockwise and the counterclockwise directions, and to dampen a greater amount in one of the clockwise or counterclockwise directions than in the other.

59 Claims, 4 Drawing Sheets

WIND ROTOR OPERABLE IN SLOW WIND SPEEDS

BACKGROUND

A need for non-conventional or alternative energy sources has been established world wide. One alternative energy source that has been considered is wind generated power. Wind generated power has gained a strong following because of the availability of this resource throughout the planet. Although the harnessing of wind has occurred for centuries, in the modern era generating electrical energy from wind in an economically viable manner has proven to be a difficult task.

Most current wind generated power technologies rely on wind turbines that utilize propeller blades which rotate at high speeds due to lift forces generated on the propeller blades by wind driven air moving past the blades. These propeller type wind turbines have a large initial cost that is a deterrent for many investors. A great deal of the cost of wind turbines results from high strength materials that are used within the wind turbines to withstand high stresses, which result from the high speed at which current wind turbines operate. Wind turbines are also subject to very high amplitude and high frequency vibrations, which result in fatigue to the various components of the wind turbines. To minimize these vibrations, the blades and other rotational components of these wind turbines must be perfectly balanced. Additionally, wind turbines are exposed to adverse weather conditions such as high winds, snow, ice, and ultraviolet radiation. Substantial engineering and maintenance resources have to be devoted to the design and operation of these wind turbines so that the wind turbines can withstand the multitude of forces, as well as the adverse conditions, to which the components of the wind turbines will be subjected. Of course, devoting substantial engineering resources to the design of wind turbines greatly increases the initial cost of these wind turbines, and devoting substantial maintenance resources greatly increases the operating costs of these wind turbines.

Additionally, wind turbines of this type have a small range of wind speeds within which they will operate. A common range of wind speeds within which the wind turbines will operate is 28 to 36 miles per hour. Obviously, these high wind speeds greatly reduce the areas within which wind turbines such as this may be used. Additionally, the necessity of such high winds results in the requirement of very tall masts to support the propeller blades. Tall masts further increase the cost of these wind turbines and also places the wind turbines within the view of many people who would rather not have their landscape dominated by wind turbines. Additionally, another undesirable result of the tall masts is bird kills. These wind turbines are tall enough to be within the flight path of many birds and have caused deaths to threatened birds such as the California condor.

For these reasons there is a need for a wind generating power sources that do not operate at very high speeds, thus reducing the fatigue and other vibrational damage that results from high speed operation as well as reducing the engineering and maintenance costs associated with the design and operation of these power sources. There is also a need for slow wind speed operating wind generating power sources so that the use of these technologies can be more widespread than in high wind areas. There is a further need for slow wind speed operating wind generating power sources so that the use of these technologies will not hinder bird populations.

SUMMARY

The present invention satisfies the need for a wind generating power source which operates at slow wind speeds.

One aspect of the invention is a wind rotor comprising a base, a rotor frame rotationally supported on the base for movement about a substantially vertical axis in one of a clockwise or counter clockwise direction, and a plurality of wind receiving vanes pivotally disposed on the rotor frame for movement about a substantially vertical axis in a clockwise and counter clockwise direction between a first closed position and a second open position. The movement of the vanes from the first closed position to the second open position is the one of the clockwise and counter clockwise direction that corresponds to the direction of the rotational movement of the rotor frame. The movement of each vane from the first closed position to the second open position further being independent of the other vanes. A variable resistance damping mechanism assembly is disposed between each vane and the rotor frame. The variable resistance damping mechanism is configured to provide damping in both the clockwise and the counterclockwise directions, and to dampen a greater amount in one of the clockwise or counterclockwise directions than in the other.

In another aspect of the invention, the substantially vertical pivot axis of each vane is substantially parallel to the substantially vertical rotational axis of the rotor frame In yet another aspect of the invention, each vane includes a body and in the first position the vane body is substantially radially disposed with respect to the rotational axis of the rotor frame.

In another aspect of the invention, while in the second position, the vane body is pivoted with respect to the rotor support to a position that is approximately 115 degrees from the closed position.

In another aspect of the invention, each vane body is substantially planar.

In another aspect of the invention, the damping mechanism assembly comprises a damping mechanism having a first and a second part, the second part being moveable with respect to the first part.

In another aspect of the invention, the first part is a cylinder, and the second part is a piston and piston rod assembly, the piston and piston rod assembly being moveable in a telescoping manner with respect to the cylinder such that the piston and piston rod assembly is extendable and compressible with respect to the cylinder.

In another aspect of the invention, the cylinder includes an internal fluid chamber, and the piston is disposed within the internal fluid chamber.

In another aspect of the invention, the cylinder includes a first closed end and a second end having an opening through which a piston rod of the piston and piston rod assembly extends.

In another aspect of the invention, each damping mechanism assembly comprises a damping mechanism and an articulating arm disposed between each damping mechanism and each vane.

In another aspect of the invention, each articulating arm includes a first end in contact with the damping mechanism and a second end in contact with a vane.

In another aspect of the invention, each articulating arm second end includes a roller, the roller being disposed for contact with a vane.

In another aspect of the invention, the cylinder includes a first valve and a second valve disposed at a spaced apart distance from the first valve, the first and second valves being in fluid communication with the internal fluid chamber of the cylinder, the piston being moveable between the first valve and the second valve from a first compressed position to a second extended position. The piston is compressed into the cylinder as the vane moves from the first closed position to the second open position.

In another aspect of the invention, the first and second valves are one way valves, the first valve constructed to allow air into the air chamber of the cylinder, the second valve constructed to allow air out of the air chamber of the cylinder.

In another aspect of the invention, each valve includes a ball disposed within a passage.

In another aspect of the invention, the wind rotor further comprises a vane stop mechanism which prevents the vane from pivoting beyond the second position.

In another aspect of the invention, the vane stop mechanism is the damping mechanism, and the vane stop mechanism establishes the second vane position at a position which is between 95 and 135 degrees from the first position.

In another aspect of the invention, the vane stop establishes the second vane position at a position which is approximately 115 degrees from the first position.

Another aspect of the invention is a wind rotor comprising a base, a rotor frame rotationally supported on the base for movement about a substantially vertical axis in one of a clockwise or counter clockwise direction, and a plurality of wind receiving vanes pivotally disposed on the rotor frame for pivotal movement about a substantially vertical axis in a clockwise and counter clockwise direction between a first closed position and a second open position. The movement of the vanes from the first closed position to the second open position is the one of the clockwise and counter clockwise direction that corresponds to the direction of the rotational movement of the rotor frame. The movement of each vane from the first closed position to the second open position further being independent of the other vanes. A variable resistance damping mechanism is disposed between each vane and the rotor frame. The variable resistance damping mechanism is speed dependent, and not position dependent, such that each damping mechanism is configured to dampen a greater amount as the speed of the vane increases.

Another aspect of the invention is a wind rotor comprising a base, a rotor frame rotationally supported on the base for movement about a substantially vertical axis in one of a clockwise or counter clockwise direction, and a plurality of wind receiving vanes pivotally disposed on the rotor frame for movement about a vertical axis in a clockwise and counter clockwise direction between a first closed position and a second open position. The movement of the vanes from the first closed position to the second open position is the one of the clockwise and counter clockwise direction that corresponds to the direction of the rotational movement of the rotor frame. The movement of each vane from the first closed position to the second open position further being independent of the other vanes. A non-spring, non-biasing damping mechanism is disposed between each vane and the rotor support. The non-spring, non-biasing damping mechanism slows the movement of each vane as each vane moves between the first and the second position, but does not urge the vane from the second open position to the first closed position.

Another aspect of the invention is a wind rotor comprising a base, a rotor frame rotationally supported on the base for movement about a substantially vertical axis in one of a clockwise or counter clockwise direction, and a plurality of wind receiving vanes pivotally disposed on the rotor frame for movement about a vertical axis in a clockwise and counter clockwise direction between a first closed position and a second open position beyond which the vane cannot pivot further. The movement of the vanes from the first closed position to the second open position is the one of the clockwise and counter clockwise direction that corresponds to the direction of the rotational movement of the rotor frame. The movement of each vane from the first closed position to the second open position further being independent of the other vanes. In the first closed position, the vane is substantially radially disposed with respect to the rotor rotational axis. And, in the second open position the vane is pivoted with respect to the rotor support to a position that is between 95 and 135 degrees of rotational movement from the first closed position.

In another aspect of the invention, the wind rotor further comprises a stop mechanism preventing the movement of each vane beyond the second open position. The stop mechanism is constructed to stop the vane in the second open position at a position that is approximately 115 degrees of rotational movement from the first closed position.

The wind rotor of the present invention does not operate at very high speeds, thus reducing the fatigue and other vibrational damage that results from high speed operation as well as reducing the engineering and maintenance costs associated with the design and operation of these power sources. The slow speed operation of the wind rotor allows the use of this technology in a variety of areas, in contrast to just high wind areas, as has typically been the case for wind power sources. The slow speed operation of the wind rotor also will not hinder bird populations.

These and other aspects and benefits of the invention will become more apparent upon analysis of the drawings, specification and claims.

DRAWINGS

DESCRIPTION

Figure 1:
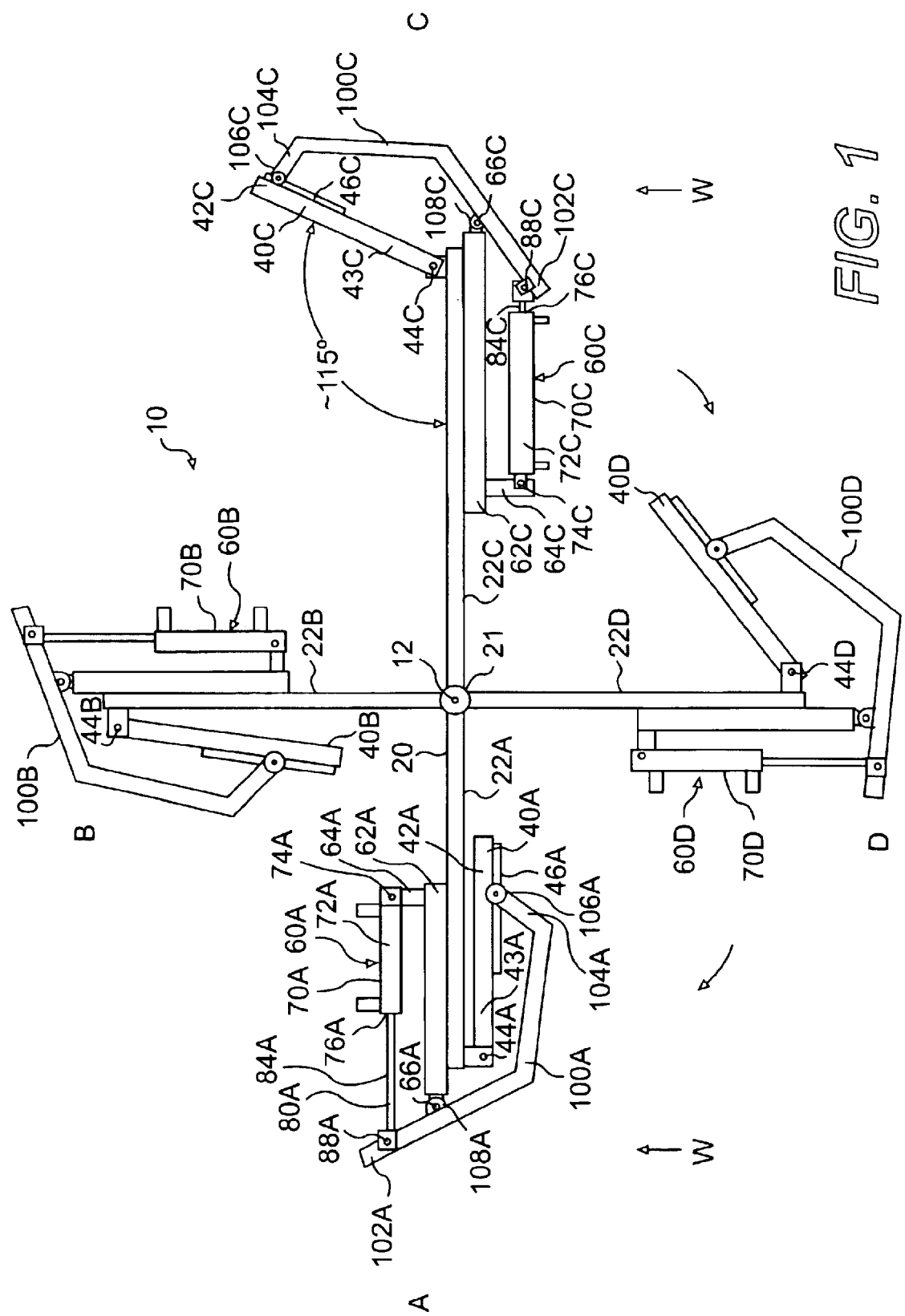
FIG. 1 is a top view of one version of the present invention.

FIG. 1 is a top view of one version of the wind rotor 10 of the present invention. As is shown, the wind rotor 10 includes a rotor frame 20, which includes a center portion 21. The rotor frame 20 is rotationally supported on a mast or base (not shown in this figure) about a center pivot 12. The rotor frame 20 moves about a substantially vertical axis in a clockwise direction. Four arms 22A–D radiate from the center portion 21 of the rotor frame 20.

Four wind receiving vanes 40A, 40B, 40C, and 40D are disposed on the rotor frame 10. The four wind receiving vanes 40A, 40B, 40C, and 40D each include a distal end 42A–42D, and a proximal end 43A–D which is pivotally disposed on the rotor frame 20 through a pivot connection 44A–D. The pivot connections 44A–D are substantially vertically disposed and allow the pivotal movement of the wind receiving vanes 40A–D with respect to the rotor frame 20 about a substantially vertical axis in a clockwise and counter clockwise direction between a first closed position (as is shown in Position A) and a second open position (as is shown in Position C). The movement of the vanes from the first closed position to the second open position is in a clockwise direction and corresponds to the direction of the rotational movement of the rotor frame 20. The pivotal movement of each vane 40A–D is independent of the other vanes. Preferably, the substantially vertical pivot axis of each vane is substantially parallel to the substantially vertical rotational axis of the rotor frame.

Each vane 40A–D includes a body, which as shown is preferably planar. In the first position, Position A, the vane body of the vane 40 is substantially radially disposed with respect to the rotational axis of the rotor frame 20. In the second position, as is shown in Position C, the vane 40C is pivoted with respect to the rotor support to a position that is approximately 115 degrees from the closed position.

A damping mechanism assembly 60A–D is disposed between each vane 40A–D and the rotor frame 20. As is shown, each damping mechanism assembly 60A–D is preferably connected to an arm through a mount 62A–D, which includes pivot tab 64A–D. Each damping mechanism assembly 60A–D comprises a damping mechanism 70A–D having a first part 72A–D and a second part 80A–D. The second part 80A–D of each damping mechanism 70A–D is moveable with respect to the first part 72A–D. The first part 72A–D is a cylinder. The second part 80A–D is a piston and piston rod assembly. The piston and piston rod assembly 80A–D is moveable in a telescoping manner with respect to the cylinder 72A–D, such that the piston and piston rod assembly 80A–D is extendable and compressible with respect to the cylinder 72A–D of each variable resistance damping mechanism assembly 60A–D. Each cylinder 72A–D includes an internal fluid chamber (not shown in this figure), and the piston (not shown in this figure) of each piston and piston rod assembly 80A–D is disposed within the internal fluid chamber of the corresponding cylinder 72A–D. Each cylinder. 72A–D also includes a first closed end, which is preferably pivotally connected to a mount tab 64A–D through pivots 74A–D, and a second end 76A–D having an opening through which a piston rod 84A–D of each piston and piston rod assembly 80A–D extends.

In addition to the damping mechanism 70A–D, each damping mechanism assembly 60A–D further comprises an articulating arm 100A–D disposed between each damping mechanism 70A–D and each vane 40A–D. Each articulating arm 100A–D includes a first end 102A–D pivotally connected to the distal end of the piston rod 84A–D of each the damping mechanism 70A–D through a pivot 88A–D. Each articulating arm 100A–D further includes and a second end 104A–D which is in contact with a vane 40A–D. Specifically, each articulating arm second end 104A–D includes a roller 106A–D, the roller being disposed for contact with a vane 40A–D. Preferably the roller 106A–D is disposed within a guide 46A–D disposed on the vane 40A–D. Each articulating arm 100A–D also includes a pivot bracket 108A–D, which is the portion of the articulating arm which is pivotally connected to a rotor arm. Specifically, in Position A, the pivot bracket 108A is pivotally connected to the mount 62A by pivot 66A. Mount 62A–D comprises the structure through which the articulating arms 100A–D are connected to the arms 22A–D of the rotor frame 20.

Figure 2:
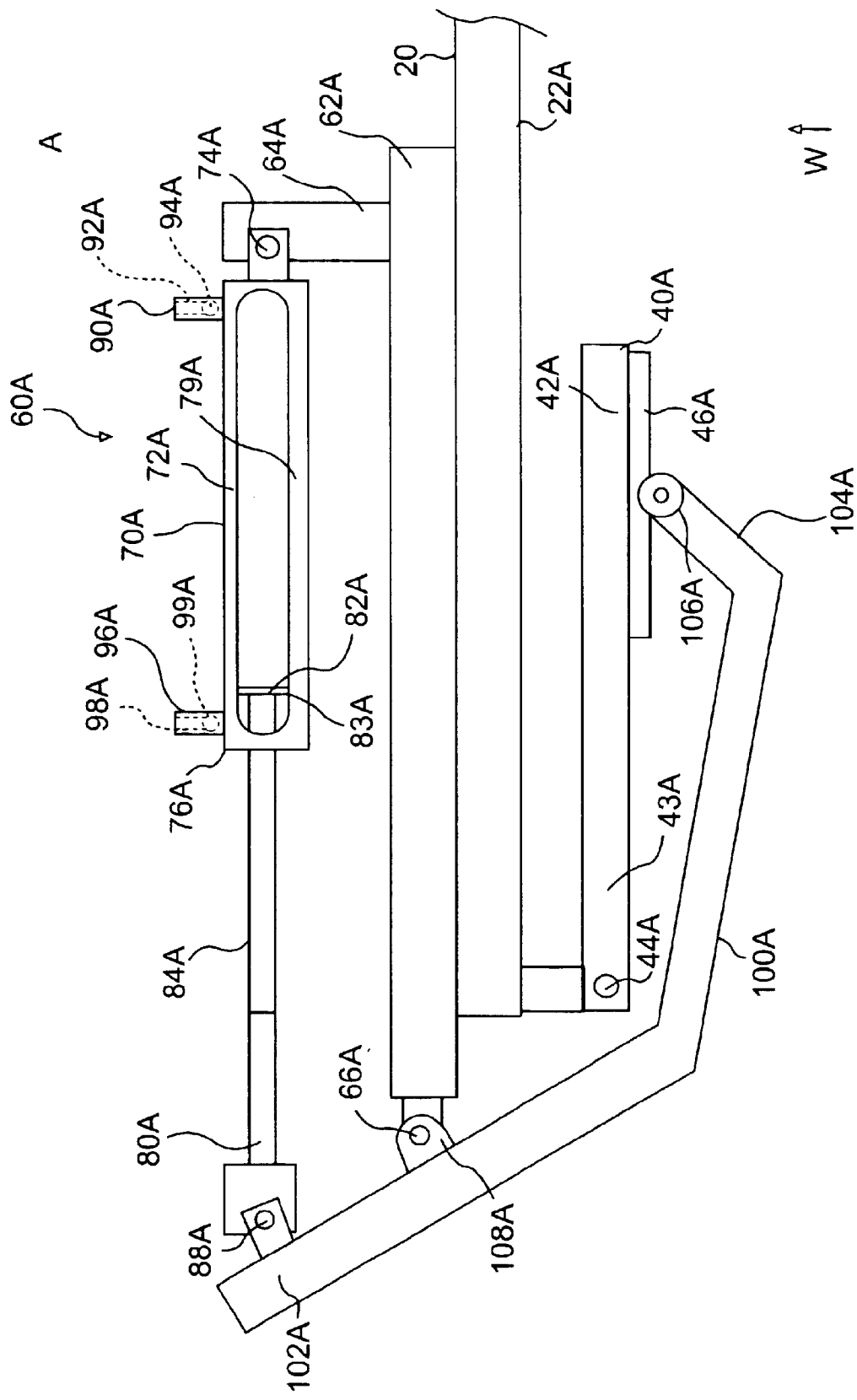
FIG. 2 is a top view showing position A from FIG. 1 in greater detail.

FIG. 2 shows Position A of FIG. 1 in greater detail. In Position A, the vane 40A is in the closed position where the vane provides a maximum drag against the wind W. Specifically, FIG. 2 shows that each cylinder (in this case cylinder 72A) includes a first valve 90A and a second valve 96A disposed at a spaced apart distance from the first valve 90A. The first valve 90A and second valve 96A are in fluid communication with the internal fluid chamber of the cylinder 72A. The internal fluid chamber is defined by the internal wall 79A which is shown through the cutout portion of the cylinder 72A.

Also shown in FIG. 2 is the piston 82A of the piston and piston rod assembly 80A. The piston 82A includes an outer surface 83A which contacts the internal wall 79A of the internal fluid chamber of the cylinder 72A. The piston 82A is moveable between the first valve 90A and the second valve 96A. Specifically, the piston 82A is movable from a first compressed position where the piston is closer to the first valve 90A, to a second extended position, as is shown in FIG. 2, where the piston is closer in proximity to the second valve 96A.

Figure 3:
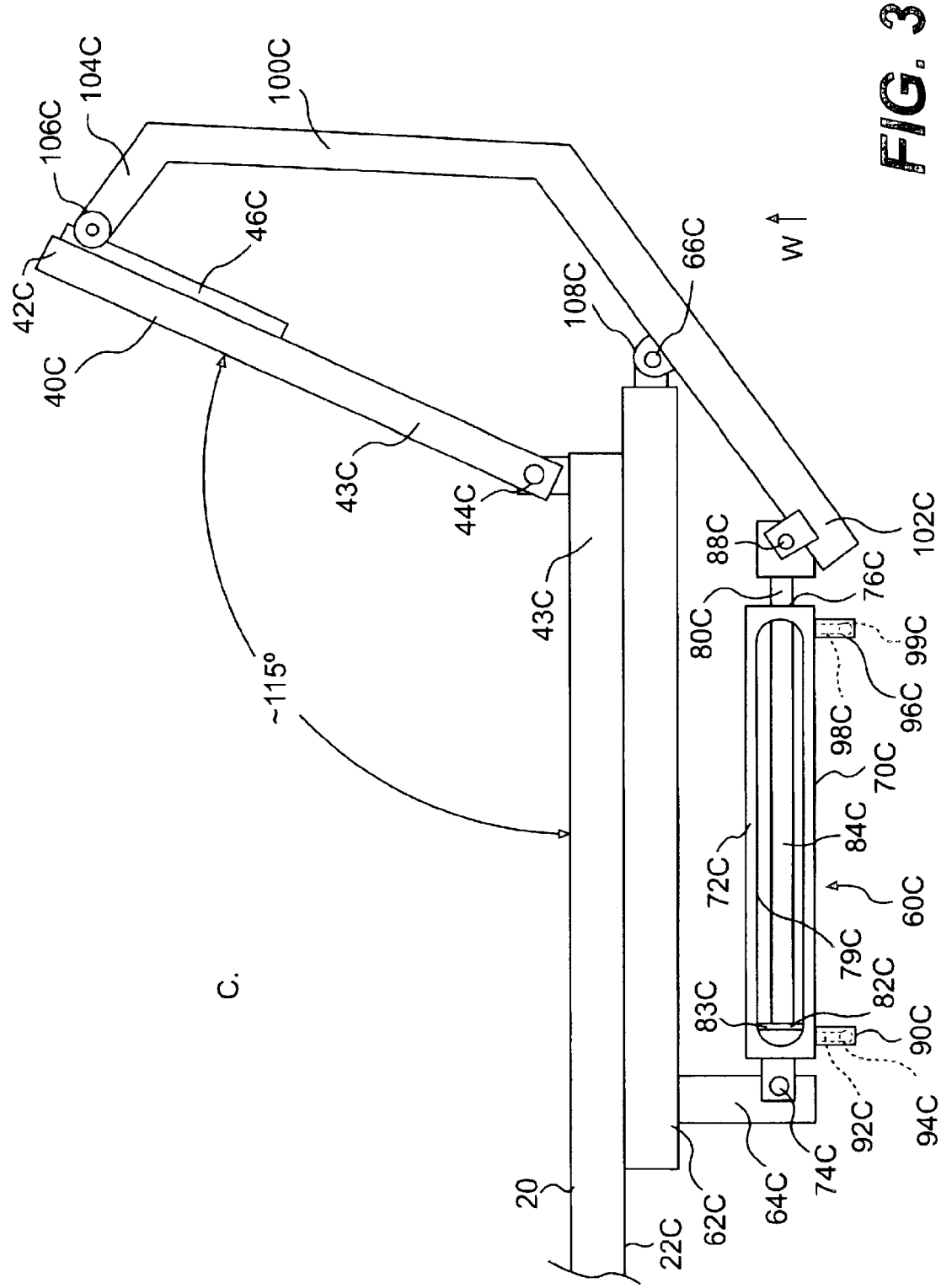
FIG. 3 is a top view showing position C from FIG. 1 in greater detail.

FIG. 3 shows Position C of FIG. 1 in greater detail. In Position C, the vane 40C is in the open position where the vane provides a minimum drag against the wind W. As is shown in this drawing, piston 82C is compressed into the cylinder 72C, as the vane 40C has been moved from the first closed position of Position A, as was shown in FIG. 2, to the second open position of Position C, as is shown here in FIG. 3.

As is also shown in FIGS. 2 and 3, the first valve 90A–D and second valve 96A–D are preferably one way valves. The first valve 90A–D is constructed to allow air into the internal air chamber of the cylinder 72A–D. The second valve 96A–D is constructed to allow air out of the air chamber of the cylinder 72A–D. Each first valve 90A–D includes a ball 94A–D disposed within a passage 92A–D. Similarly, each second valve 96A–D includes a ball 99A–D disposed within a passage 98A–D. The ball of each valve is movable from a first position where the valve passage is open, to a second position where the valve passage is closed. Such one way valves are well known and are also known as check valves.

Figure 4:
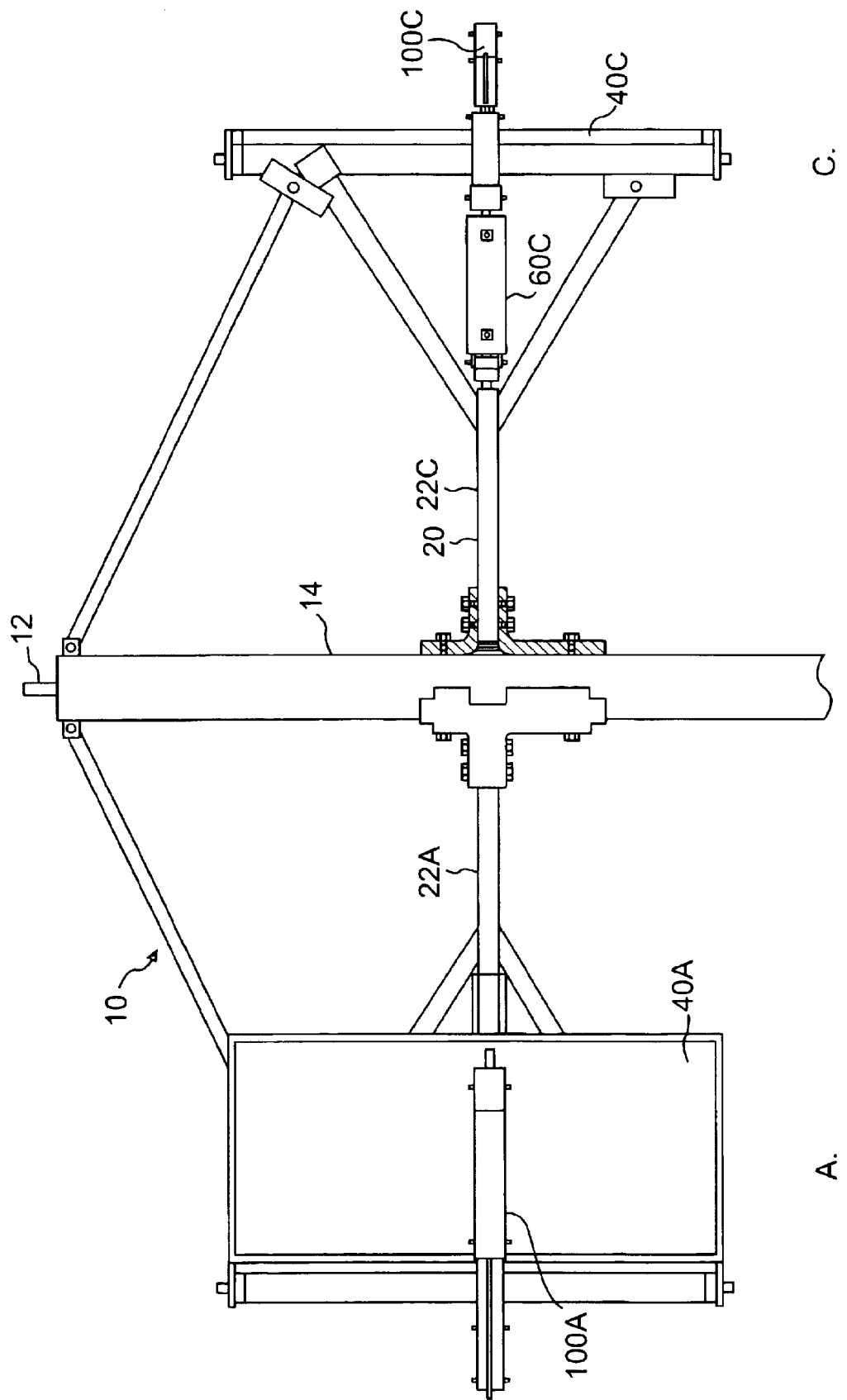
FIG. 4 is a side view showing positions A and C from FIG. 1.

FIG. 4 shows the wind rotor 10 from a side view. Positions A and C are shown in this figure, as positions B and D have been removed for clarity. FIG. 4 shows that the vanes 40A–D are preferably rectangular panels. However, it is understood that vanes may be configured in a variety of shapes and sizes. FIG. 4 also shows the base 14, which in this case is a mast, upon which the rotor frame is supported. The mast is only partially shown. It is understood that the mast could be supported on the ground or on another structure. It is also understood that a base other than a mast could be used. Such a base could comprise a tower, a building, etc.

FIG. 4 does not show the mechanism through which the rotational movement of the rotor frame is converted to uses such as electrical generation. Such mechanisms are well known and for that reason have not been included herein.

In use, the wind rotor 10 of the present invention is configured to move in the clockwise direction, although it is understood that the wind rotor 10 could have been easily configured to move in the counter clockwise direction. If the wind rotor 10 had been configured to move in the counter clockwise direction the vanes 40A–D would have similarly moved in a counter clockwise direction from the closed to the open position.

The wind rotor 10 allows wind force and centrifugal forces on each of the vanes 40A–D to move each vane 40A–D independently with respect to the rotor frame 20 as the force of the wind causes the entirety of the wind rotor 10 to move in the clockwise direction. Centrifugal forces on the clockwise moving wind rotor 10 cause the vanes 40A–D to rotate in a clockwise direction with respect to the pivots 44A–D, about which the vanes 40A–D rotate.

In position A of FIG. 1, vane 40A is in a position where the vane is directly facing the wind W, where the vane provides a maximum drag against the wind W. The vane 40A is also in a position where the vane 40A is substantially radially disposed with respect to the axis of rotation of the wind rotor 10. In Position B of FIG. 1, vane 40B is in a position 90 degrees from Position A. In Position B, vane 40B is just beginning to open as a result of centrifugal force and wind forces on the vane 40B. Accordingly, vane 40B is in the process of rotating about the pivot 44B in a clockwise direction. Position C shows the vane 40C at a position 180 degrees from the vane 40A, which is in Position A. In Position C, centrifugal forces and wind forces have caused vane 40C to move clockwise to the fully open position where the vane provides a minimum drag against the wind W. In the fully open position of Position C, the vane 40C has rotated in a clockwise direction about the pivot 44C between 95 and 135 degrees from the first closed position of Position A. Preferably, the vane has rotated between 105 and 125 degrees from the first position. Optimally, the vane has rotated approximately 115 degrees from the first position. In the vane Position C, the rotation of vane 40C beyond 90 degrees causes vane 40C to be actually tacking into the wind. In Position D, vane 40D is just beginning to close as a result of wind forces acting on it. Specifically, the force of the wind on the vane 40D is opposing the centrifugal force on the vane 40D and is overcoming the centrifugal force causing the vane 40D to rotate in a counter clockwise direction about the pivot 44D.

As the vanes move from Position A to Position C during rotational movement of the wind rotor 10, the damping mechanism assembly 60A–D slows or dampens the clockwise rotational movement of the vanes 40A–D.

Specifically, the damping mechanism assembly 60A–D slows or dampens the clockwise rotational movement of the vanes 40A–D through the provision of the telescoping piston and piston rod assembly 80A–D that moves within the internal fluid chamber disposed within the cylinder 72A–D. The piston 82A of the piston and piston rod assembly 80A–D includes an outer surface 83A–D which is in contact with the internal wall 79A–D of the cylinder 72A–D. As the piston 82A–D compresses into the cylinder 72A–D, air within the internal fluid chamber must bleed past the piston outer surface 83A–D, or in other words pass between the piston outer surface 83A–D and the internal wall 79A–D, for the piston 82A–D to be able to continue to compress. Air pressure within the internal fluid chamber of the cylinder 72A–D will build up in front of the piston, thus slowing or damping the movement of the piston 82A–D. As the air bleeds past the piston outer surface 83A–D the piston 82A–D is able to advance and further compress into the cylinder 72A–D.

During the compression of the piston 82A–D into the cylinder 72A–D, which occurs when the vane 40A–D moves from the closed Position A to the open Position C, the ball 92A–D within the one way valve 90A–D is moved from the first position where the ball was proximate to the cylinder 72A–D and the valve passage 94A–D was open, to the second position where the ball 92A–D has moved away from the cylinder 72A–D and the valve passage 94A–D is closed. Because the one way valve 90A–D is closed, air pressure builds up in front of the piston as was previously described.

As the piston and piston rod assembly 80A–D compresses into the cylinder 72A–D of the damping mechanism 60A–D, the articulating arm 100A–D pivots about the pivot 66A, because the articulating arm is connected to the distal end of the piston rod 84A–D through the pivot 88A. At the same time, the roller 106A–D that is located at the distal end of the articulating arm 100A–D contacts the vane 40A–D. Thus, the articulating arm 100A–D of the damping mechanism assembly 60A–D translates the damping forces from the damping mechanism 70A–D to the vane 40A–D.

The faster the vane 40A–D moves from the closed Position A to the fully open Position C, the higher the damping force are generated by the damping mechanism 70A–D. In other words, the faster the vane 40A–D moves as a result of the wind forces and centrifugal forces which act on the vane 40A–D causing the vane to rotate in a clockwise direction about the pivot 44A–D, the higher the damping forces produced by the damping mechanism 70A–D to oppose this movement. Specifically, the faster the vane moves, the faster the air pressure builds up in front of the piston 82A–D, thus the greater the force opposing the movement. In this way, the damping mechanism assembly 60A–D provides variable resistance. The damping mechanism 70A–D is therefore a variable resistance damping mechanism that is disposed between each vane and the rotor frame. Specifically the damping mechanism 70A–D is speed dependent, and not position dependent. Each damping mechanism 70A–D is configured to dampen a greater amount as the rotational speed of the vane 40A–D to which it is connected increases. The damping mechanism 70A–D is not dependent on the rotational speed of the wind rotor frame 20.

The damping mechanism 70A–D is a non-spring, non-biasing damping mechanism. The build up of air pressure in front of the piston 82A–D only slows the movement of each vane as each vane moves between the first and the second position. This build up of air pressure does not urge the vane from the second open position to the first closed position.

The damping mechanism 70A–D also provides the damping mechanism assembly 60A–D the function of a vane stop mechanism. The maximum rotation of the vane between 95 and 135 degrees is produced when the damping mechanism 70A–D is in the fully compressed condition shown in Position C. Specifically, the piston and piston rod assembly 80A–D of the damping mechanism 70A–D is fully compressed into the cylinder 72A–D and the van cannot open further. Optimally, this second or fully open position is established when the vane has rotated clockwise approximately 115 degrees from the first position. It is understood that a separate vane stop mechanism comprising a barrier which contacts the vane independently of the damping mechanism assembly 60A–D could also have been used to establish the second fully open position, which is shown as Position C, in FIG. 1.

The damping mechanism assembly 60A–D provides a minimum of slowing or damping to the counter clockwise rotational movement of the vanes 40A–D. This minimal damping of the vanes 40A–D during the counter clockwise rotational movement that occurs as the vanes 40A–D move from the open Position C to the closed Position A, also occurs through the provision of the telescoping piston and piston rod assembly 80A–D that moves within the internal fluid chamber disposed within the cylinder 72A–D. However, as the piston 82A–D extends from the cylinder 72A–D during the closing of the vanes 40A–D air within the internal fluid chamber does not need to bleed past the piston outer surface 83A–D for this extension to occur. In other words, air does not need to pass between the piston outer surface 83A–D and the internal wall 79A–D, for the piston 82A–D to be able to extend. Air pressure within the internal fluid chamber of the cylinder 72A–D does not build up behind the piston to slow or dampen the movement of the piston 82A–D, because the air is able to leave the internal fluid chamber of the cylinder 72A–D through the one way air valve 96A–D. As the air bleeds out the valve 96A–D the piston 82A–D is able to advance and further extend from the cylinder 72A–D. Air also enters the internal fluid chamber of the cylinder 72A–D through the other valve 90A–D.

The minimal damping which occurs during the during the counter clockwise rotational movement that occurs as the vanes 40A–D move from the open Position C to the closed Position A, occurs due to a small amount of friction which occurs between the outer surface of the piston 83A–D and the cylinder internal wall 79A–D as telescoping piston and piston rod assembly 80A–D extends from the cylinder 72A–D.

More specifically, during the extension of the piston 82A–D from the cylinder 72A–D, which occurs when the vane 40A–D moves from the open Position C to the closed Position A, the ball 98A–D within with the one way valve 96A–D is moved from the first position where the ball was proximate to the cylinder 72A–D and the valve passage 99A–D was closed, to the second position where the ball 98A–D has moved away from the cylinder 72A–D and the valve passage 99A–D is open. Because the one way valve 90A–D is open, no air pressure builds up behind the piston and the piston 82A–D moves freely within the cylinder 72A–D. Again, air which is displaced by the piston 82A–D is replaced in the internal fluid chamber of the cylinder 72A–D by entering into the internal fluid chamber through the other valve 90A–D.

As the piston and piston rod assembly 80A–D extends from the cylinder 72A–D of the damping mechanism 60A–D, the articulating arm 100A–D pivots about the pivot 66A, because the articulating arm is connected to the distal end of the piston rod 84A–D through the pivot 88A. At the same time, the roller 106A–D that is located at the distal end of the articulating arm 100A–D remains in contact the vane 40A–D as the roller is engaged to a guide 46A–D that is attached to the vane 40A–D. Thus, the articulating arm 100A–D of the damping mechanism assembly 60A–D translates the minimal damping forces from the damping mechanism 70A–D to the vane 40A–D during the movement of the vanes 40A–D from the second open position, Position C, to the closed position, Position A.

Although a specific version of the invention has been shown and described herein, it is understood that the invention comprises modifications that would not depart from the scope of the invention.

For example, a hydraulic damping mechanism could be utilized in the invention. Such damping mechanisms are known and include a piston with valved openings. The piston is configured to move within an oil filled cylinder.

Accordingly, those skilled in the art will appreciate that other changes, modifications, or substitutions are also possible without departing from the scope and spirit of the invention as disclosed in the accompanying claims.

What is claimed is:

1. A wind rotor comprising:
   a base,
   a rotor frame rotationally supported on the base for movement about a substantially vertical axis in one of a clockwise or counter clockwise direction,
   a plurality of wind receiving vanes pivotally disposed on the rotor frame for pivotal movement with respect to the rotor frame about a substantially vertical axis in a clockwise and counter clockwise direction between a first closed position and a second open position, the movement of the vanes from the first closed position to the second open position being the one of the clockwise and counter clockwise direction that corresponds to the direction of the rotational movement of the rotor frame, and
   a variable resistance damping mechanism assembly disposed between each vane and the rotor frame, the variable resistance damping mechanism assemblies being configured to provide damping in both the clockwise and the counterclockwise directions of the vanes pivotal movement with respect to the rotor frame, the variable resistance damping mechanism assembly further configured to dampen a greater amount in one of the clockwise or counterclockwise directions than in the other.

2. The wind rotor of claim 1, wherein the substantially vertical pivot axis of each vane is substantially parallel to the substantially vertical rotational axis of the rotor frame.

3. The wind rotor of claim 1, wherein each vane includes a body and in the first position the vane body is substantially radially disposed with respect to the rotational axis of the rotor frame.

4. The wind rotor of claim 1, wherein each vane includes a body and in the second position the vane body is pivoted with respect to the rotor frame to a position that is approximately 115 degrees from the closed position.

5. The wind rotor of claim 1, wherein each vane body is substantially planar.

6. The wind rotor of claim 1, wherein the damping mechanism assembly comprises a damping mechanism having a first and a second part, the second part being moveable with respect to the first part.

7. The wind rotor of claim 6, wherein the first part is a cylinder, and the second part is a piston and piston rod assembly, the piston and piston rod assembly being moveable in a telescoping manner with respect to the cylinder such that the piston and piston rod assembly is extendable and compressible with respect to the cylinder.

8. The wind rotor of claim 7, wherein:
   the cylinder includes an internal fluid chamber, and
   the piston is disposed within the internal fluid chamber.

9. The wind rotor of claim 8, wherein:
   the cylinder includes a first valve and a second valve disposed at a spaced apart distance from the first valve, the first and second valves being in fluid communication with the internal fluid chamber of the cylinder,
   the piston is moveable between the first valve and the second valve from a first compressed position to a second extended position, and
   the piston compresses into the cylinder while the vane moves from the first closed position to the second open position.

10. The wind rotor of claim 9, wherein the first and second valves are one way valves, the first valve constructed to allow air into the air chamber of the cylinder, the second valve constructed to allow air out of the air chamber of the cylinder.

11. The wind rotor of claim 10, wherein each valve includes a ball disposed within a passage.

12. The wind rotor of claim 7, wherein the cylinder includes a first closed end and a second end having an opening through which a piston rod of the piston and piston rod assembly extends.

13. The wind rotor of claim 6, wherein each damping mechanism assembly comprises a damping mechanism and an articulating arm disposed between each damping mechanism and each vane.

14. The wind rotor of claim 13, wherein each articulating arm includes a first end in contact with the damping mechanism and a second end in contact with a vane.

15. The wind rotor of claim 14, wherein each articulating arm second end includes a roller, the roller being disposed for contact with a vane.

16. The wind rotor of claim 1, further comprising a vane stop mechanism which prevents the vane from pivoting beyond the second position.

17. The wind rotor of claim 16, wherein the vane stop mechanism is the damping mechanism, and the vane stop mechanism establishes the second vane position at a position which is between 95 and 135 degrees from the first position.

18. The wind rotor of claim 17, wherein the vane stop establishes the second vane position at a position which is approximately 115 degrees from the first position.

19. A wind rotor comprising:
a base,
a rotor frame rotationally supported on the base for movement about a substantially vertical axis in one of a clockwise or counter clockwise direction,
a plurality of wind receiving vanes pivotally disposed on the rotor frame for pivotal movement with respect to the rotor frame about a substantially vertical axis in a clockwise and counter clockwise direction between a first closed position and a second open position, the pivotal movement of the vanes from the first closed position to the second open position being the one of the clockwise and counter clockwise direction that corresponds to the direction of the rotational movement of the rotor frame, and
a variable resistance damping mechanism assembly disposed between each vane and the rotor frame, the variable resistance damping mechanism assemblies being speed dependent, and not position dependent, such that each variable resistance damping mechanism assembly is configured to dampen a greater amount as the speed of the pivotal movement of the vane with respect to the rotor frame increases as the vane pivotally moves between the first closed position and the second open position.

20. The wind rotor of claim 19, wherein the substantially vertical pivot axis of each vane is substantially parallel to the substantially vertical rotational axis of the rotor frame.

21. The wind rotor of claim 19, wherein each vane includes a body and in the first position the vane body is substantially radially disposed with respect to the rotational axis of the rotor frame.

22. The wind rotor of claim 21, wherein each vane body is substantially planar.

23. The wind rotor of claim 19, wherein each vane includes a body and in the second position the vane body is pivoted with respect to the rotor frame to a position that is approximately 115 degrees from the closed position.

24. The wind rotor of claim 19, wherein the damping mechanism assembly comprises a damping mechanism having a first and a second part, the second part being moveable with respect to the first part.

25. The wind rotor of claim 24, wherein the first part is a cylinder, and the second part is a piston and piston rod assembly, the piston and piston rod assembly being moveable in a telescoping manner with respect to the cylinder such that the piston and piston rod assembly is extendable and compressible with respect to the cylinder.

26. The wind rotor of claim 25, wherein:
the cylinder includes an internal fluid chamber, and
the piston is disposed within the internal fluid chamber.

27. The wind rotor of claim 26, wherein:
the cylinder includes a first valve and a second valve disposed at a spaced apart distance from the first valve, the first and second valves being in fluid communication with the internal fluid chamber of the cylinder,
the piston is moveable between the first valve and the second valve from a first compressed position to a second extended position, and
the piston compresses into the cylinder while the vane moves from the first closed position to the second open position.

28. The wind rotor of claim 27, wherein the first and second valves are one way valves, the first valve constructed to allow air into the air chamber of the cylinder, the second valve constructed to allow air out of the air chamber of the cylinder.

29. The wind rotor of claim 25, wherein the cylinder includes a first closed end and a second end having an opening through which a piston rod of the piston and piston rod assembly extends.

30. The wind rotor of claim 24, wherein each damping mechanism assembly comprises a damping mechanism and an articulating arm disposed between each damping mechanism and each vane.

31. The wind rotor of claim 30, wherein each articulating arm includes a first end in contact with the damping mechanism and a second end in contact with a vane.

32. The wind rotor of claim 19, further comprising a vane stop mechanism which prevents the vane from pivoting beyond the second position.

33. The wind rotor of claim 32, wherein the vane stop mechanism is the damping mechanism, and the vane stop mechanism establishes the second vane position at a position which is between 95 and 135 degrees from the first position.

34. The wind rotor of claim 33, wherein the vane stop establishes the second vane position at a position which is approximately 115 degrees from the first position.

35. A wind rotor comprising:
a base,
a rotor frame rotationally supported on the base for movement about a substantially vertical axis in one of a clockwise or counter clockwise direction,
a plurality of wind receiving vanes pivotally disposed on the rotor frame for pivotal movement with respect to the rotor frame about a substantially vertical axis in a clockwise and counter clockwise direction between a first closed position and a second open position, the pivotal movement of the vanes from the first closed position to the second open position being the one of the clockwise and counter clockwise direction that corresponds to the direction of the rotational movement of the rotor frame, and
a non-spring, non-biasing damping mechanism assembly comprising an enclosed fluid chamber disposed between each vane and the rotor support, wherein the non-spring, non-biasing damping mechanism assembly slows the movement of each vane as each vane pivotally moves between the first and the second position, but does not urge the vane from the second open position to the first closed position.

36. The wind rotor of claim 35, wherein the substantially vertical pivot axis of each vane is substantially parallel to the substantially vertical rotational axis of the rotor frame.

37. The wind rotor of claim 35, wherein each vane includes a body and in the first position the vane body is substantially radially disposed with respect to the rotational axis of the rotor frame.

38. The wind rotor of claim 35, wherein each vane includes a body and in the second position the vane body is pivoted with respect to the rotor frame to a position that is approximately 115 degrees from the closed position.

39. The wind rotor of claim 35, wherein each vane body is substantially planar.

40. The wind rotor of claim 35, wherein the damping mechanism assembly comprises a damping mechanism having a first and a second part, the second part being moveable with respect to the first part.

41. The wind rotor of claim 40, wherein the first part is a cylinder, and the second part is a piston and piston rod assembly, the piston and piston rod assembly being moveable in a telescoping manner with respect to the cylinder such that the piston and piston rod assembly is extendable and compressible with respect to the cylinder.

42. The wind rotor of claim 41, wherein:
the cylinder includes the enclosed fluid chamber, and
the piston is disposed within the fluid chamber.

43. The wind rotor of claim 42, wherein the cylinder includes a first closed end and a second end having an opening through which a piston rod of the piston and piston rod assembly extends.

44. The wind rotor of claim 42, wherein:
the cylinder includes a first valve and a second valve disposed at a spaced apart distance from the first valve, the first and second valves being in fluid communication with the internal fluid chamber of the cylinder,
the piston is moveable between the first valve and the second valve from a first compressed position to a second extended position, and
the piston compresses into the cylinder while the vane moves from the first closed position to the second open position.

45. The wind rotor of claim 44, wherein the first and second valves are one way valves, the first valve constructed to allow air into the air chamber of the cylinder, the second valve constructed to allow air out of the air chamber of the cylinder.

46. The wind rotor of claim 40, wherein each damping mechanism assembly comprises a damping mechanism and an articulating arm disposed between each damping mechanism and each vane.

47. The wind rotor of claim 46, wherein each articulating arm includes a first end in contact with the damping mechanism and a second end in contact with a vane.

48. The wind rotor of claim 35, further comprising a vane stop mechanism which prevents the vane from pivoting beyond the second position.

49. The wind rotor of claim 48, wherein the vane stop mechanism is the damping mechanism, and the vane stop mechanism establishes the second vane position at a position which is between 95 and 135 degrees from the first position.

50. The wind rotor of claim 49, wherein the vane stop establishes the second vane position at a position which is approximately 115 degrees from the first position.

51. A wind rotor comprising:
a base,
a rotor frame rotationally supported on the base for movement about a substantially vertical axis in one of a clockwise or counter clockwise direction, and
a plurality of wind receiving vanes pivotally disposed on the rotor frame for pivotal movement with respect to the rotor frame about a substantially vertical axis in a clockwise and counter clockwise direction between a first closed position and a second open position beyond which the vane cannot pivot further, the pivotal movement of the vanes from the first closed position to the second open position being the one of the clockwise and counter clockwise direction that corresponds to the direction of the rotational movement of the rotor frame,
wherein in the first closed position the vane is substantially radially disposed with respect to the rotor rotational axis, and in the second open position the vane is pivoted with respect to the rotor support to a position that is between 95 and 135 degrees of rotational movement from the first closed position.

52. The wind rotor of claim 51, further comprising a stop mechanism preventing the movement of each vane beyond the second open position, the stop mechanism being constructed to stop the vane in the second open position at a position that is approximately 115 degrees of rotational movement from the first closed position.

53. The wind rotor of claim 51, wherein the substantially vertical pivot axis of each vane is substantially parallel to the substantially vertical rotational axis of the rotor frame.

54. The wind rotor of claim 51, wherein each vane includes a body and in the first position the vane body is substantially radially disposed with respect to the rotational axis of the rotor frame.

55. The wind rotor of claim 54, wherein each vane body is substantially planar.

56. The wind rotor of claim 51, wherein each vane includes a body and in the second position the vane body is pivoted with respect to the rotor frame to a position that is approximately 115 degrees from the closed position.

57. The wind rotor of claim 51, wherein the damping mechanism assembly comprises a damping mechanism having a first and a second part, the second part being moveable with respect to the first part.

58. The wind rotor of claim 57, wherein the first part is a cylinder having an internal fluid chamber, and the second part is a piston and piston rod assembly, the piston and piston rod assembly being moveable in a telescoping manner with respect to the cylinder such that the piston and piston rod assembly is extendable and compressible with respect to the cylinder.

59. The wind rotor of claim 57, wherein each damping mechanism assembly comprises a damping mechanism and an articulating arm disposed between each damping mechanism and each vane.

* * * * *